(12) United States Patent
Liu et al.

(10) Patent No.: US 10,041,240 B2
(45) Date of Patent: *Aug. 7, 2018

(54) MINOR WATER LEAK PREVENTION APPARATUS FOR WATER INLET VALVE

(71) Applicant: Lab (Xiamen) Sanitary Fittings Inc, Xiamen (CN)

(72) Inventors: Yongmao Liu, Xiamen (CN); Zipeng Zhang, Xiamen (CN)

(73) Assignee: LAB (XIAMEN) SANITARY FITTINGS INC, Xiamen, Fujian (CN)

( * ) Notice: Subject to any disclaimer, the term of this patent is extended or adjusted under 35 U.S.C. 154(b) by 113 days.

This patent is subject to a terminal disclaimer.

(21) Appl. No.: 15/039,852

(22) PCT Filed: Jun. 6, 2014

(86) PCT No.: PCT/CN2014/079363
§ 371 (c)(1),
(2) Date: May 27, 2016

(87) PCT Pub. No.: WO2015/184639
PCT Pub. Date: Dec. 10, 2015

(65) Prior Publication Data
US 2017/0002555 A1    Jan. 5, 2017

(51) Int. Cl.
| | |
|---|---|
| *E03D 1/33* | (2006.01) |
| *F16K 33/00* | (2006.01) |
| *F16K 31/24* | (2006.01) |
| *F16K 31/26* | (2006.01) |
| *E03D 1/32* | (2006.01) |
| *F16K 31/34* | (2006.01) |
| *E03D 1/12* | (2006.01) |

(52) U.S. Cl.
CPC .................. *E03D 1/33* (2013.01); *E03D 1/32* (2013.01); *F16K 31/26* (2013.01); *F16K 31/34* (2013.01);
(Continued)

(58) Field of Classification Search
CPC ........... E03D 1/087; E03D 1/12; E03D 1/125; E03D 1/304; E03D 1/32; E03D 1/33;
(Continued)

(56) References Cited

U.S. PATENT DOCUMENTS 1,475,582 A * 11/1923 Herty ...................... E03D 1/125
4/373
3,049,010 A *  8/1962 Holderith ................ F16K 33/00
73/322.5

(Continued)

*Primary Examiner* — Michael R Reid
*Assistant Examiner* — Richard K Durden
(74) *Attorney, Agent, or Firm* — Leong C. Lei

(57) ABSTRACT

A minor water leak prevention apparatus for a water inlet valve, in which a float is mounted on a regulation bar and received in a water container. The water container is mounted on a siphon tube. The siphon tube is formed with an air aperture. A counterweight buoyance switch is mounted on the water container. The counterweight buoyance switch has a counterweight water compartment having a lower end forming a water drain hole. The counterweight water compartment has an upper end to which a closure pressing plate is mounted. The closure pressing plate is opposite to the air aperture. The counterweight buoyance switch controls opening/closing of the air aperture. This arrangement allows water ingress through a water inlet valve to be stopped when minor water leakage occurs in a water tank.

4 Claims, 12 Drawing Sheets

(52) U.S. Cl.
CPC ............... *F16K 33/00* (2013.01); *E03D 1/12* (2013.01); *E03D 1/125* (2013.01); *F16K 31/24* (2013.01); *Y10T 137/2849* (2015.04); *Y10T 137/2856* (2015.04); *Y10T 137/7329* (2015.04)

(58) Field of Classification Search
CPC ... E03D 1/35; E03D 1/36; F16K 31/18; F16K 31/20; F16K 31/22; F16K 31/24; F16K 31/26; F16K 31/28; F16K 33/00; Y10T 137/2849; Y10T 137/2856; Y10T 137/7329
USPC .............................. 4/373, 391, 394, 395, 669
See application file for complete search history.

(56) References Cited

U.S. PATENT DOCUMENTS

| | | | | |
|---|---|---|---|---|
| 4,471,798 A * | 9/1984 | Johannesen | ............... | E03D 1/33 137/135 |
| 5,661,855 A * | 9/1997 | Osmond | ................. | E03D 1/00 137/135 |
| 6,244,292 B1 * | 6/2001 | Antunez | ................. | F16K 21/18 137/218 |
| 6,510,866 B2 * | 1/2003 | Li | ............... | E03D 1/32 137/2 |
| 6,659,125 B1 * | 12/2003 | Autunez | ................. | E03D 1/32 137/414 |
| 8,640,672 B2 * | 2/2014 | Carlstrom | ............... | F02B 37/02 123/323 |
| 9,441,354 B2 * | 9/2016 | Liu | ............ | E03D 1/32 |
| 9,464,420 B2 * | 10/2016 | Magar | ....................... | E03D 1/00 |
| 2013/0068321 A1 * | 3/2013 | Guthrie | ................. | F16K 31/34 137/434 |
| 2013/0198944 A1 * | 8/2013 | Liu | ............ | E03D 1/00 4/415 |
| 2015/0074894 A1 * | 3/2015 | Kim | ....................... | E03D 1/308 4/395 |
| 2016/0168834 A1 * | 6/2016 | Magar | ....................... | E03D 1/32 137/434 |
| 2017/0002946 A1 * | 1/2017 | Liu | ............ | E03D 1/32 |

* cited by examiner

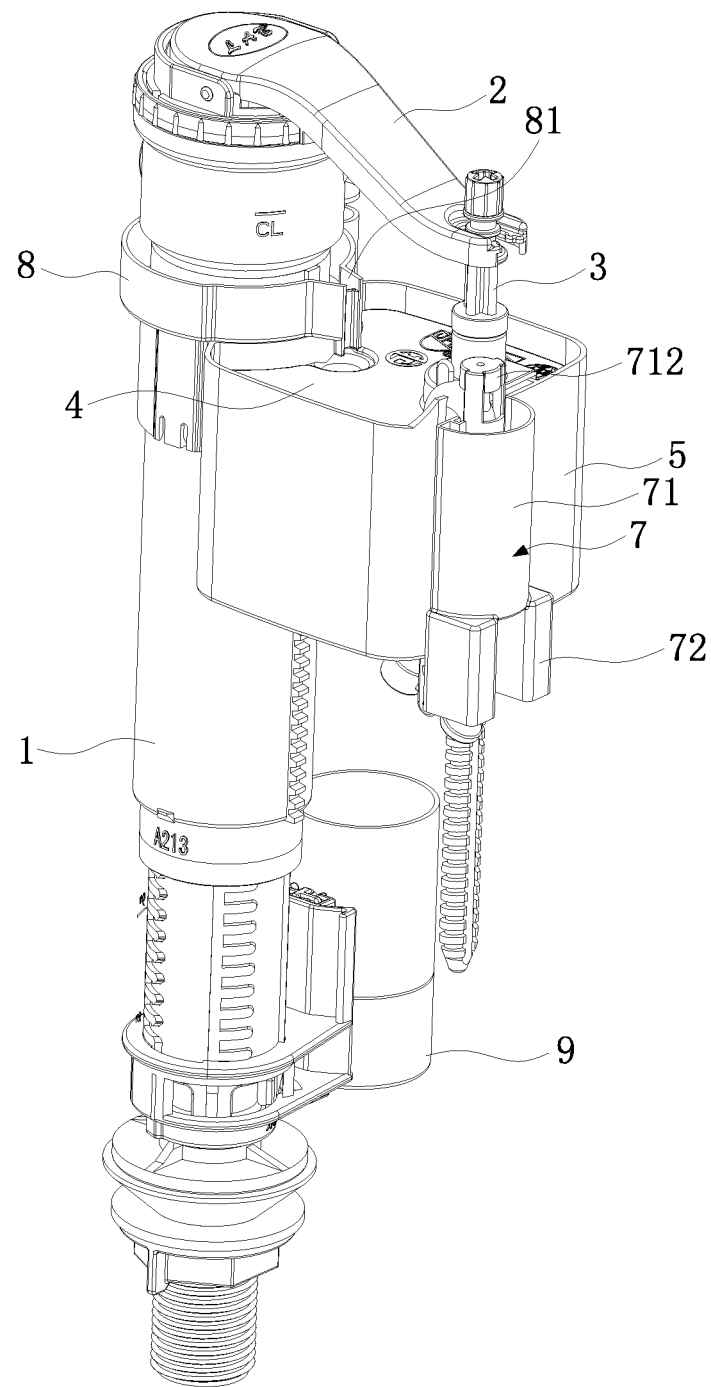
F I G. 1

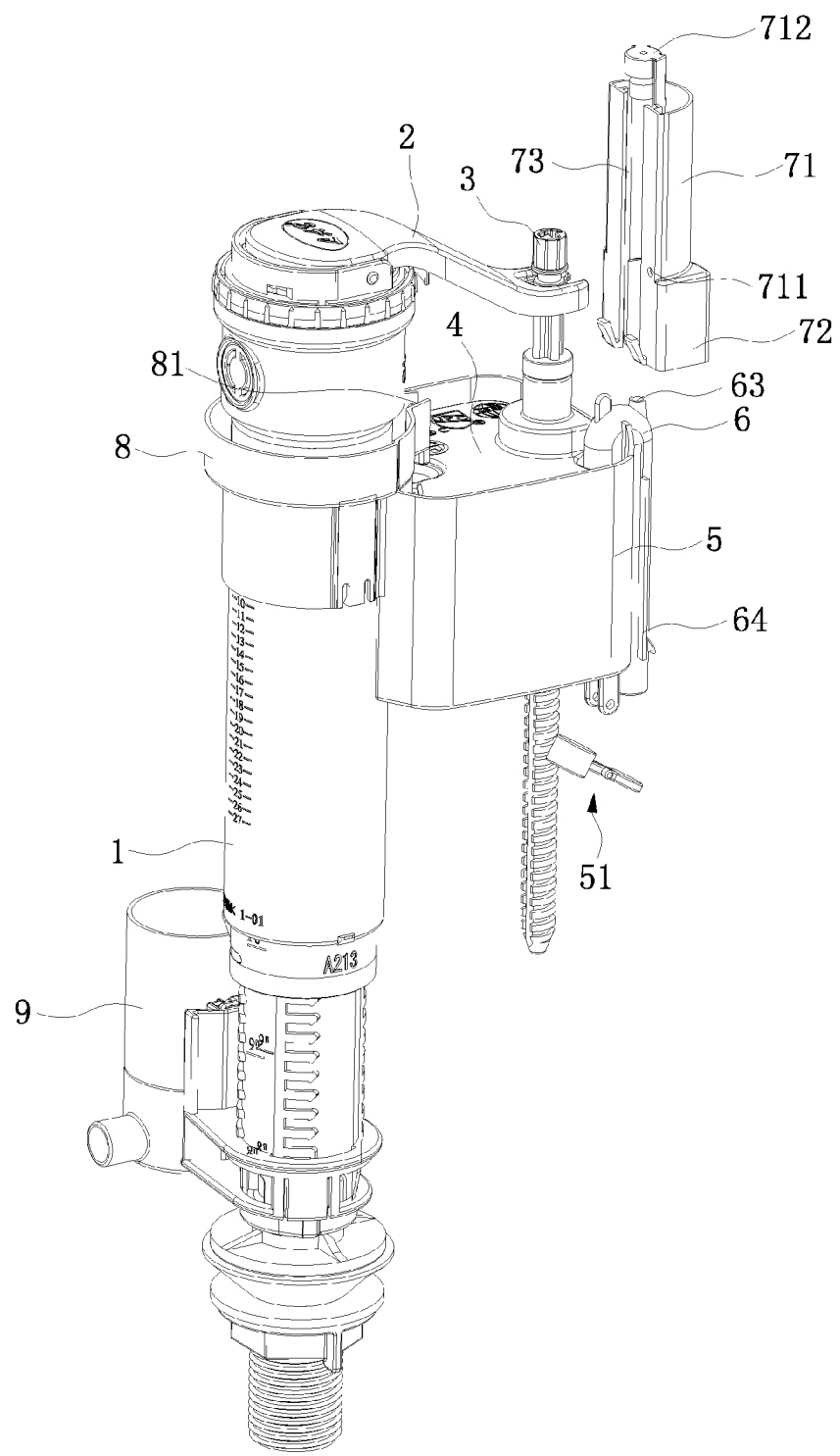
F I G. 3

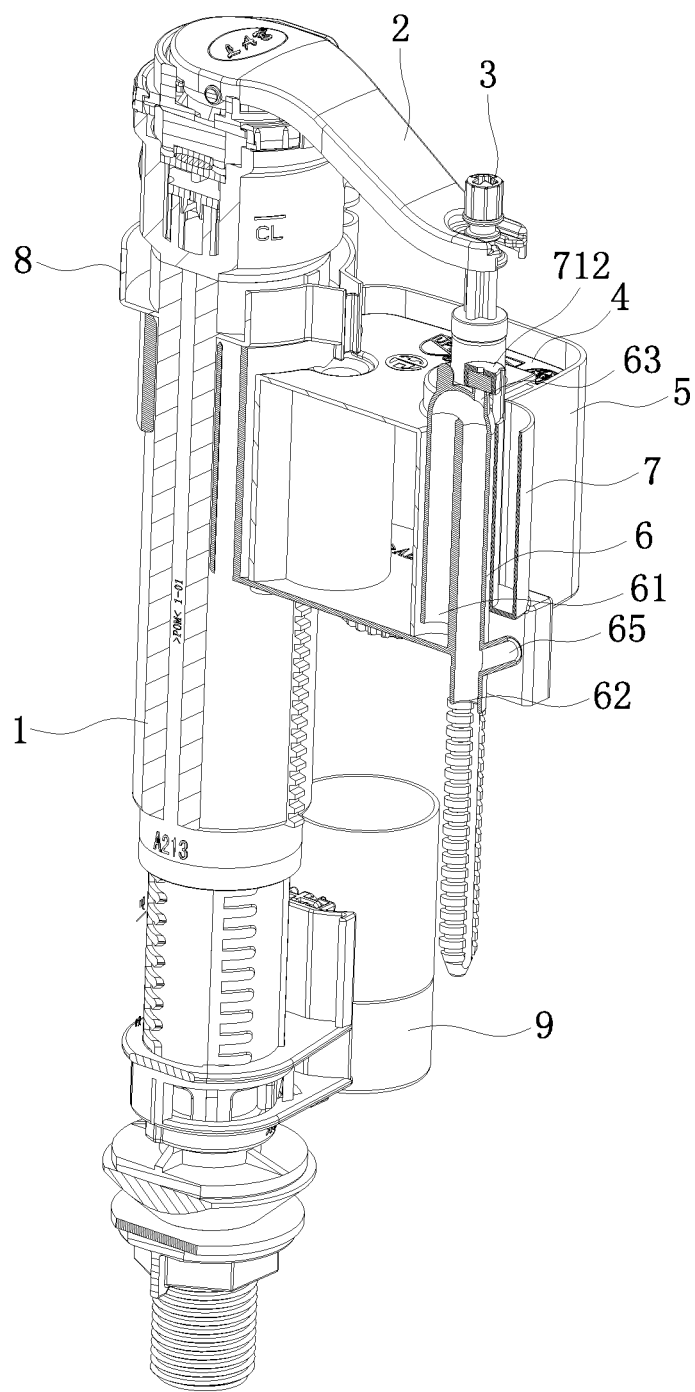
F I G. 5

MINOR WATER LEAK PREVENTION APPARATUS FOR WATER INLET VALVE

(a) TECHNICAL FIELD OF THE INVENTION

The present invention relates generally to the technical field of water inlet valves, and more particularly to a minor water leak prevention apparatus for water inlet valves.

(b) DESCRIPTION OF THE PRIOR ART

Heretofore, a water inlet valve generally comprises a water inlet tube, a top cover, a back pressure pad, a swing arm, a float, and a water container. A lower end of the water inlet tube is mounted to a water supply tube of a water tank. The top cover is set on an upper end on the water inlet tube. The cover is formed with a back pressure hole. The swing arm has a middle section that is pivotally mounted on the top cover. An end of the swing arm corresponds to the back pressure hole and is provided with the back pressure pad. An opposite end of the swing arm is connected to a regulation bar of the float. The float is arranged in the water container and the water container is mounted on the water inlet tube. Sealing members are provided among these components to secure water tightness.

In use, when water level of the water container drops, the float is driven by gravity to descend, causing the swing arm to rotate so that the back pressure pad opens the back pressure hole to allow water that flows through the water supply tube to move through the water inlet tube, the top cover, and the back pressure hole to enter the water tank, achieving water ingress. After the water levels of the water container rises, the float is brought upward by buoyance so as to cause the swing arm to rotate, making the back pressure pad re-close the back pressure hole, whereby a water stop pad generates back pressure expansion to block the water ingress opening, and thus shutting down water ingress.

Such a water inlet valve comprises a water drain hole formed in the bottom of the water container. When the water level of the water tank drops down, water contained in the water container flows through the water drain hole into the water tank to cause the float to lose buoyance and driven by gravity to descend for causing the swing arm to rotate and open the back pressure hole for water ingress. However, after a long period of service, the water tank may malfunction. For example, the discharge valve may not close completely, leading to a slow water leak (minor water leak). Under such a condition, water is maintained supplied through the water inlet valve and water continuously leaks from the water tank thereby leading to a waste of water resources.

Thus, the present invention aims to improve the structure of the water inlet valve in order to shut down water ingress through the water inlet valve in case of any event of the above-discussed situation.

SUMMARY OF THE INVENTION

An object of the present invention is to provide a minor water leak prevention apparatus for a water inlet valve, which stops water ingress through the water inlet valve when minor water leak occurs in a water tank so as to help save water resources.

To achieve the above object, the present invention adopts a solution as follows:

A minor water leak prevention apparatus for a water inlet valve is provided, which is mounted on a water inlet valve body and comprises a swing arm, a regulation bar, a float, a water container, a siphon tube, and a counterweight buoyance switch; the swing arm is rotatably mounted to the water inlet valve body, the swing arm having an end to which a back pressure pad is mounted to correspond to a back pressure hole of the water inlet valve body, the swing arm having an opposite end connected to the regulation bar; the float is mounted on the regulation bar and received in the water container, the water container being mounted on the water inlet valve body; the siphon tube is mounted on the water container, the siphon tube being formed with an air aperture; the counterweight buoyance switch is mounted on the water container, the counterweight buoyance switch comprising a counterweight water compartment and a buoyance water compartment that are independent of each other, the counterweight water compartment having a lower end in which a water drain hole is formed, the counterweight water compartment having an upper end to which a closure pressing plate is provided, the closure pressing plate corresponding to the air aperture, the counterweight buoyance switch controlling opening/closing of the air aperture.

Further, the counterweight buoyance switch is mounted on the siphon tube in an up and down slidable manner, wherein in a condition where buoyance force on the counterweight buoyance switch is greater than the weight thereof, the counterweight buoyance switch slides upward and thus floats up thereby opening the air aperture of the siphon tube; and in a condition where the buoyance of the counterweight buoyance switch is smaller than the weight thereof, the counterweight buoyance switch slides downward and sinks down thereby making the closure pressing plate block the air aperture and thus closing the air aperture of the siphon tube.

Further, the counterweight buoyance switch is rotatably mounted, through a pivot pin, to the water container wherein in a condition where the buoyance of the counterweight buoyance switch is greater than the weight thereof, the counterweight buoyance switch swings upwards and floats up thereby opening the air aperture of the siphon tube and in a condition where the buoyance of the counterweight buoyance switch is smaller than the weight thereof, the counterweight buoyance switch swings downward and sinks down, making the closure pressing plate block the air aperture thereby closing the air aperture of the siphon tube.

Further, an air evacuation hole is formed in a lower end portion of the siphon tube, the air evacuation hole being connected, via the passageway pipe, with an air pump, whereby actuating the air pump to evacuate air from the siphon tube releases pressure from the siphon tube so that water of the water container is drained through the siphon tube.

Further, a leverage bar is pivotally connected to the water container, the leverage bar having an end to which a counterweight is mounted and an opposite end that is provided with a closure pad that corresponds to and is mateable with the water egress opening of the siphon tube, the closure pad being opposite to the water egress opening, wherein in a condition where the air pump evacuates air from the siphon tube, the closure pad closes the water egress opening.

Further, a link bar is pivotally connected to the water container, the link bar having an end corresponding to the float received in the water container and an opposite end connected to a pull wire, the pull wire being connected to an actuation button, whereby actuating the actuation button pulls the pull wire to make the link bar swing and one end of the link bar depresses the float down to have water contained in the water container drained through the siphon tube.

Also included are a water receptacle tray and a counterweight float, wherein the water receptacle tray is mounted on the water inlet valve body and is located above the water container, the water receptacle tray comprising an overflow port, the overflow port being opposite to the water container, the water receptacle tray having a bottom in which an opening is formed; the counterweight float is mounted on a lower end of the water inlet valve body, the counterweight float comprising a water compartment, a buoyance compartment, and a fixation seat, the water compartment and the buoyance compartment being independent of each other but integrated together, the water compartment and the buoyance compartment being movably mounted on the fixation seat, the fixation seat being mounted on the water inlet valve body, the fixation seat comprising a water discharge opening, the water discharge opening being connected, via the passageway pipe, to the bottom opening of the water receptacle tray; and in a condition where the weight of the water compartment is greater than buoyance, the water compartment blocks the water discharge opening and in a condition where the weight of the water compartment is smaller than the buoyance, the water compartment opens the water discharge opening.

With the above solution, when water ingress is performed in a normal way, water flows through the water inlet valve body into the water tank and the water level of the water tanks starts to rise so that when the water level of the water tank reaches a highest position of the water container, water flows into the water container. After water level inside the water container rises, the float is acted upon by buoyance to float up thereby driving the swing arm to rotate and making the back pressure pad close the back pressure hole. The expansion of a water sealing pad generates a backward pressure to block water inlet opening and stop water ingress.

Since the siphon tube is formed with the air aperture, after stop of water supply, the water levels in inside and outside tube of the siphon tube are the same. During normal discharging, water contained in the counterweight water compartment mounted to the counterweight buoyance switch is constrained by the water drain hole so as to drain relatively slowly. As a result, the weight of the counterweight buoyance switch overcomes the buoyance provided by the lower side, which keeps the counterweight buoyance switch in a down position, blocking the opening of the air aperture of the siphon, allowing water to be automatically drained from the water container through the siphon.

When the water tank is continuously suffering minor water leakage (seepage or creep), the water level of the water tank slowly drops down and under this condition, the counterweight buoyance switch is acted upon by the buoyance of the buoyance water compartment, where the buoyance acting on the counterweight buoyance switch is greater than the weight thereof, the air aperture of the siphon tube is opened, and the siphon effect of the siphon tube is released. In the present invention, the bottom of the water container is not provided with an opening so that the water level inside the water container does not drop and thus, the swing arm is not caused to rotate and the back pressure hole is not opened, whereby the water inlet valve does not allow for water ingress and the water resources can be saved. Under this condition, With the water level of the water tank slowly dropping down and water contained in the counterweight water compartment of the counterweight buoyance switch slowly flowing out through the water drain hole, the water level of the counterweight water compartment is substantially identical to the outside water level. Under this condition, the counterweight buoyance switch is still acted upon by the buoyance of the buoyance water compartment and the buoyance of the counterweight buoyance switch is still greater than the gravity thereof so that the air aperture of the siphon tube is kept open and water level outside the siphon tube drops simultaneously. Continuous dropping of the water level of the water tank eventually drains off the water contained in the counterweight water compartment and the counterweight buoyance switch is acted upon by the weight to close the air aperture of the siphon tube. Under this condition, the water level of the water tank drops with a greater extent and outside water level of the siphon is lowered to a position close to the air aperture, making it not possible to induce a large suction force and no siphon effect is induced in the siphon tube, so that the water level of the water container is still kept from dropping down. And, thus, water ingress through the water inlet valve is not enabled so as to effectively prevent water leaking and water resources can be saved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a perspective view of the present invention.

FIG. 3 is an exploded view of the present invention taken from another angle (the counterweight float and the leverage bar being shown in exploded form).

FIG. 5 is a partly cross-sectional view of the present invention (a water container, a siphon tube, and a counterweight float being shown in sectioned form).

DETAILED DESCRIPTION OF THE PREFERRED EMBODIMENTS

Figure 2:
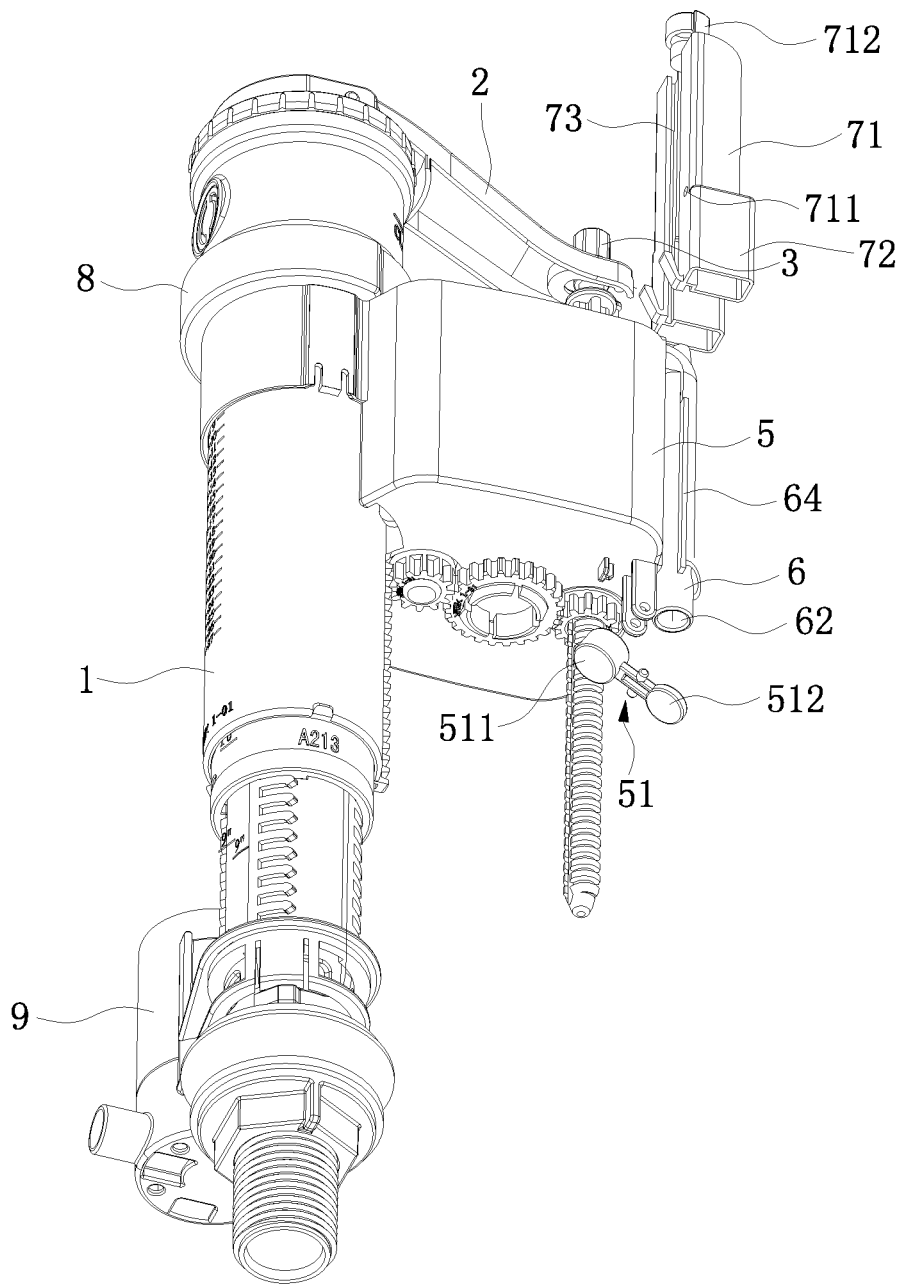
FIG. 2 is a partly exploded view of the present invention (a counterweight float and a leverage bar being shown in exploded form).

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-12, the present invention discloses a minor water leak prevention apparatus for a water inlet valve, which is mounted on a water inlet valve body 1 and comprises a swing arm 2, a regulation bar 3, a float 4, a water container 5, a siphon tube 6, and a counterweight buoyance switch 7.

Figure 10:
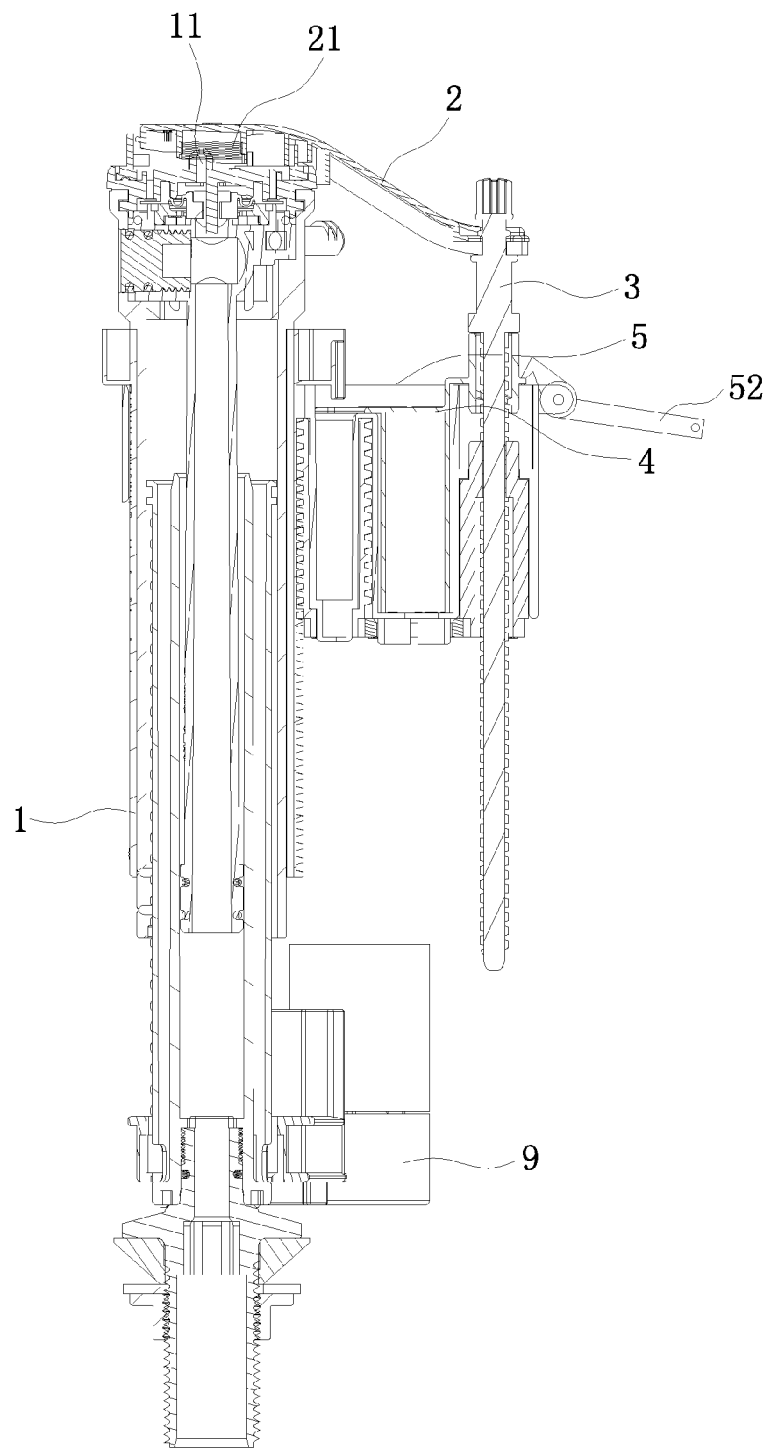
FIG. 10 is a cross-sectional view of another structure of the pressure release unlocking mechanism of the present invention.

As shown in FIG. 10, the swing arm 2 is rotatably mounted to the water inlet valve body 1. The swing arm 2 has an end to which a back pressure pad 21 is mounted to exactly correspond to a back pressure hole 11 of the water inlet valve body 1. The swing arm 2 has an opposite end connected to the regulation bar 3. The float 4 is mounted on the regulation bar 3 and is received in the water container 5. The water container 5 is mounted on the water inlet valve body 1. The structure so described is a known structure.

Figure 4:
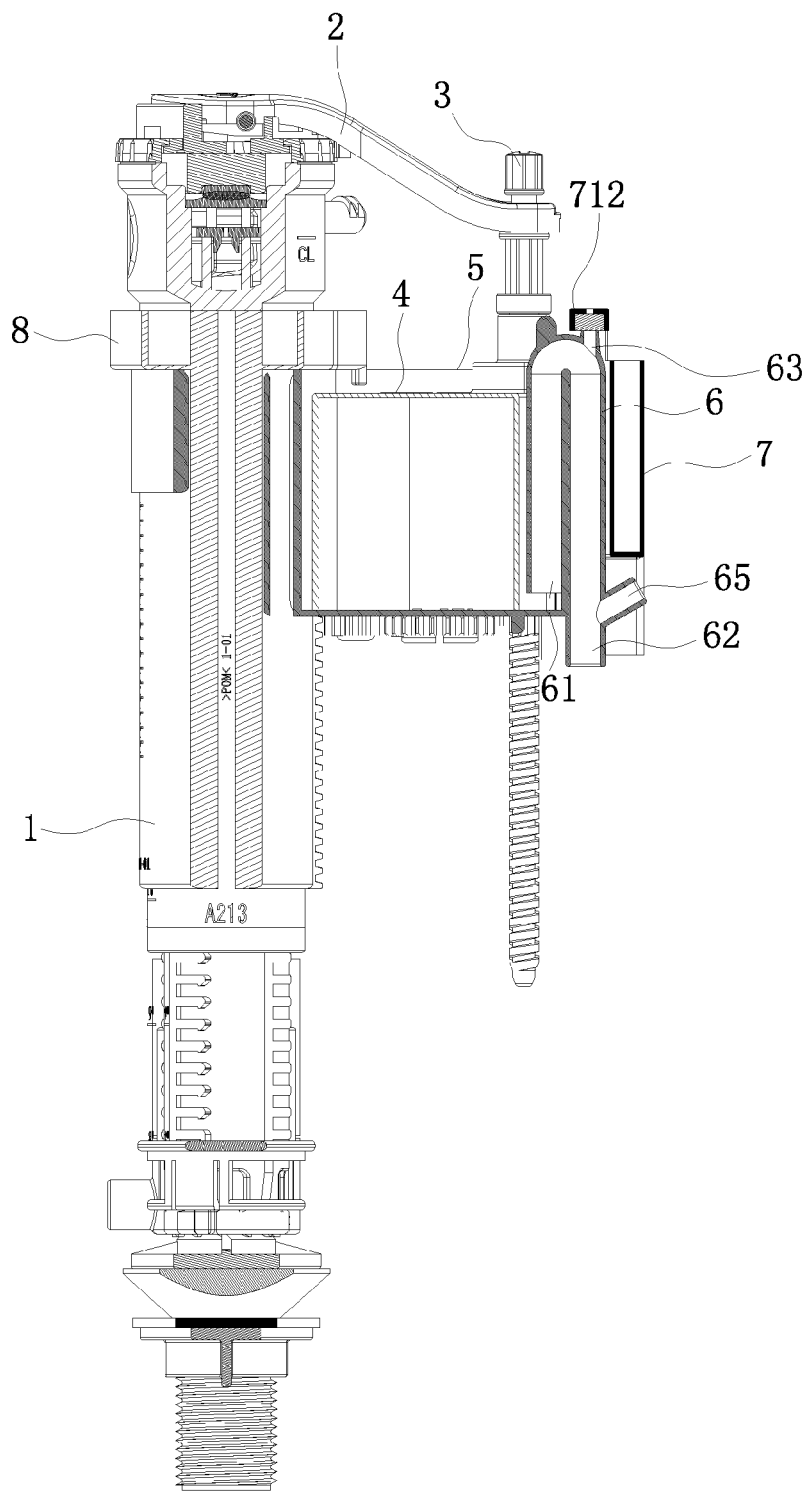
FIG. 4 is a cross-sectional view of the present invention.
Figure 6:
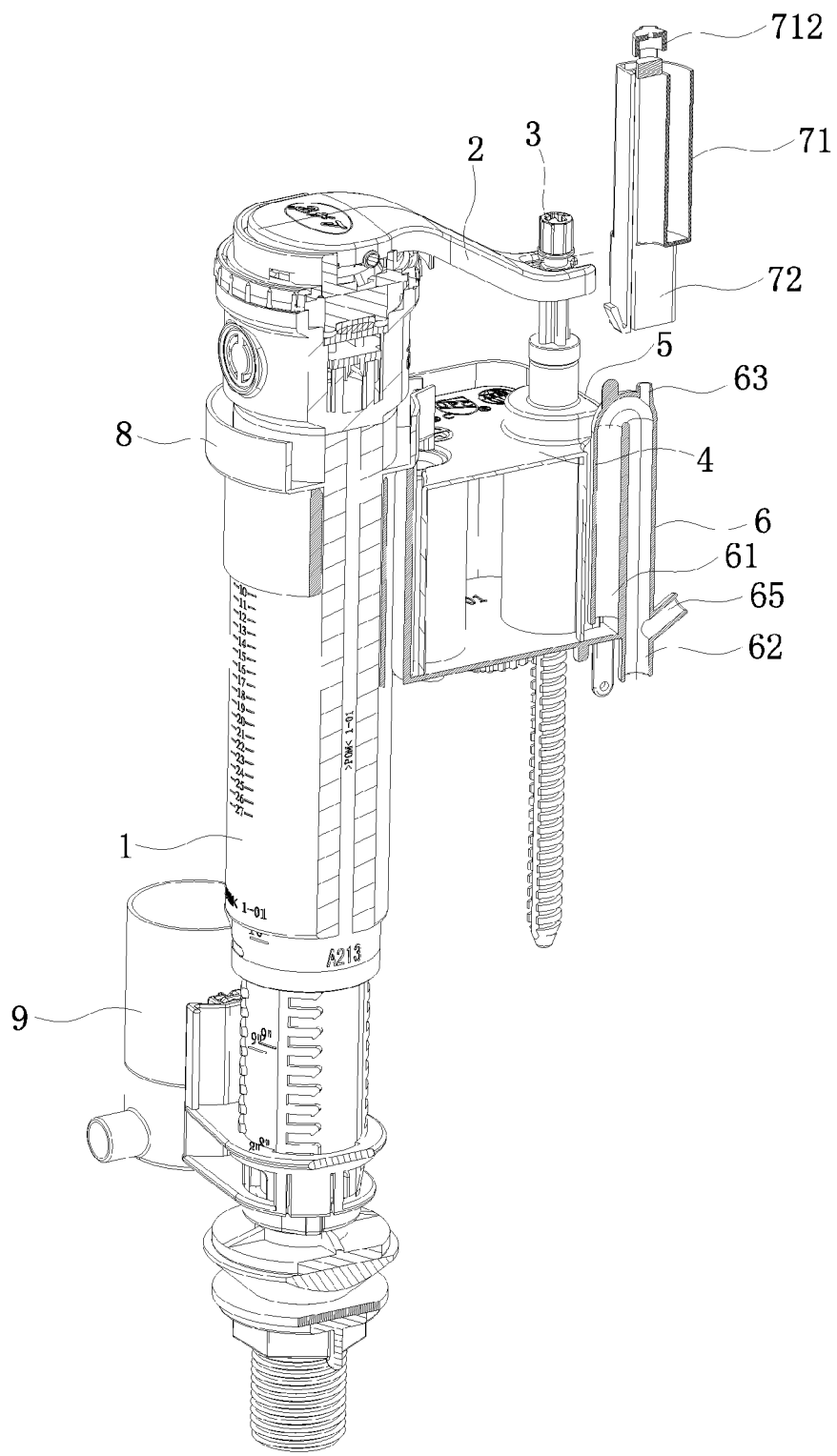
FIG. 6 is a partly cross-sectional view of the present invention (a water container, a siphon tube, and a counterweight float being shown in sectioned form) taken from a different angle.

As shown in FIGS. 3 and 4, the siphon tube 6 is mounted on the water container 5. The siphon tube 6 has a water ingress opening 61 that is located on a bottom of the water container 5. The siphon tube 6 has a water egress opening 62 that is located outside the water container 5. The water ingress opening 61 is at a height that is greater than a height of the water egress opening 62 such that the water ingress opening 61 is located higher than the water egress opening 62; and the height of the water egress opening 62 is lower than the bottom of the water container 5. The description is the common principle of the siphon tube 6. An air aperture 63 is formed in siphon tube 6.

As shown in FIGS. 1 and 4, the counterweight buoyance switch 7 is mounted on the water container 5. The counterweight buoyance switch 7 comprises a counterweight water compartment 71 and a buoyance water compartment 72 that are independent of each other. The counterweight water compartment 71 has a lower end in which a water drain hole 711 is formed. The counterweight water compartment 71 has an upper end to which a closure pressing plate 712 is provided. The closure pressing plate 712 corresponds to the air aperture 63. The counterweight buoyance switch 7 controls opening/closing of the air aperture 63. In other words, in a condition where buoyance of the counterweight buoyance switch 7 is greater than the weight thereof, the counterweight buoyance switch 7 floats up thereby opening the air aperture 63 of the siphon tube 6; and in a condition where the buoyance of the counterweight buoyance switch 7 is smaller than the weight thereof, the counterweight buoyance switch 7 sinks down thereby making the closure pressing plate 712 block the air aperture 63 and thus closing the air aperture 63 of the siphon tube 6.

As shown in FIGS. 1, 3, and 4, the counterweight buoyance switch 7 is mounted on the siphon tube 6 in an up and down slidable manner and a specific way of mounting is such that, as shown in FIG. 3, an insertion strip 64 is formed on the siphon tube 6 and an insertion slot 73 is formed in the counterweight buoyance switch 7, wherein the insertion strip 64 is inserted into the insertion slot 73 to allow the counterweight buoyance switch 7 to be movably mounted, in an up and down slidable manner, to the siphon tube 6.

In a condition where buoyance of the counterweight buoyance switch 7 is greater than the weight thereof, the counterweight buoyance switch 7 slides upward and thus floats up thereby opening the air aperture 63 of the siphon tube 6; and in a condition where the buoyance of the counterweight buoyance switch 7 is smaller than the weight thereof, the counterweight buoyance switch 7 slides downward and sinks down thereby making the closure pressing plate 712 block the air aperture 63 and thus closing the air aperture 63 of the siphon tube 6.

Figure 7:
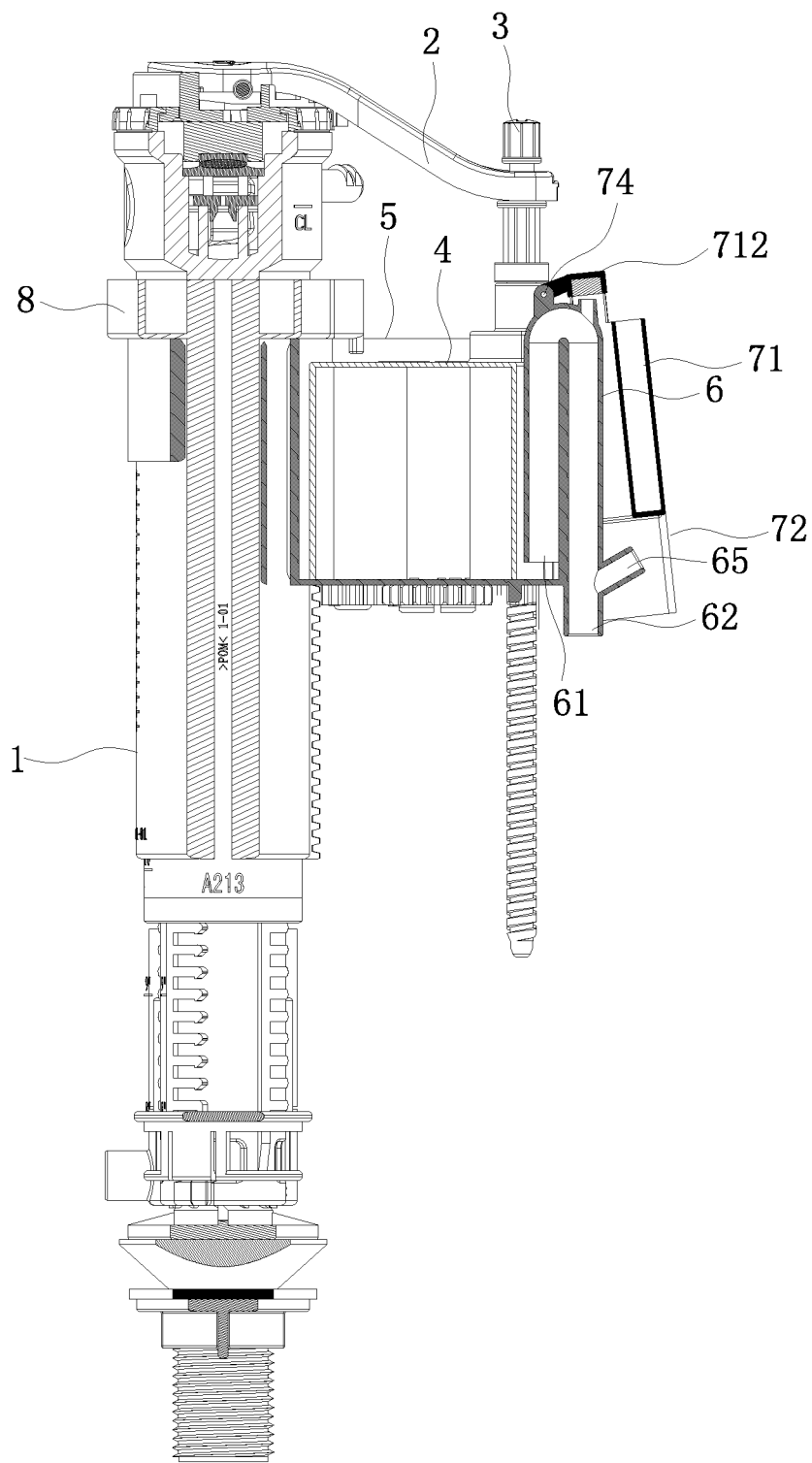
FIG. 7 is a cross-sectional view illustrating another mounting structure of the counterweight float of the present invention (an air aperture of a siphon tube being not closed).
Figure 8:
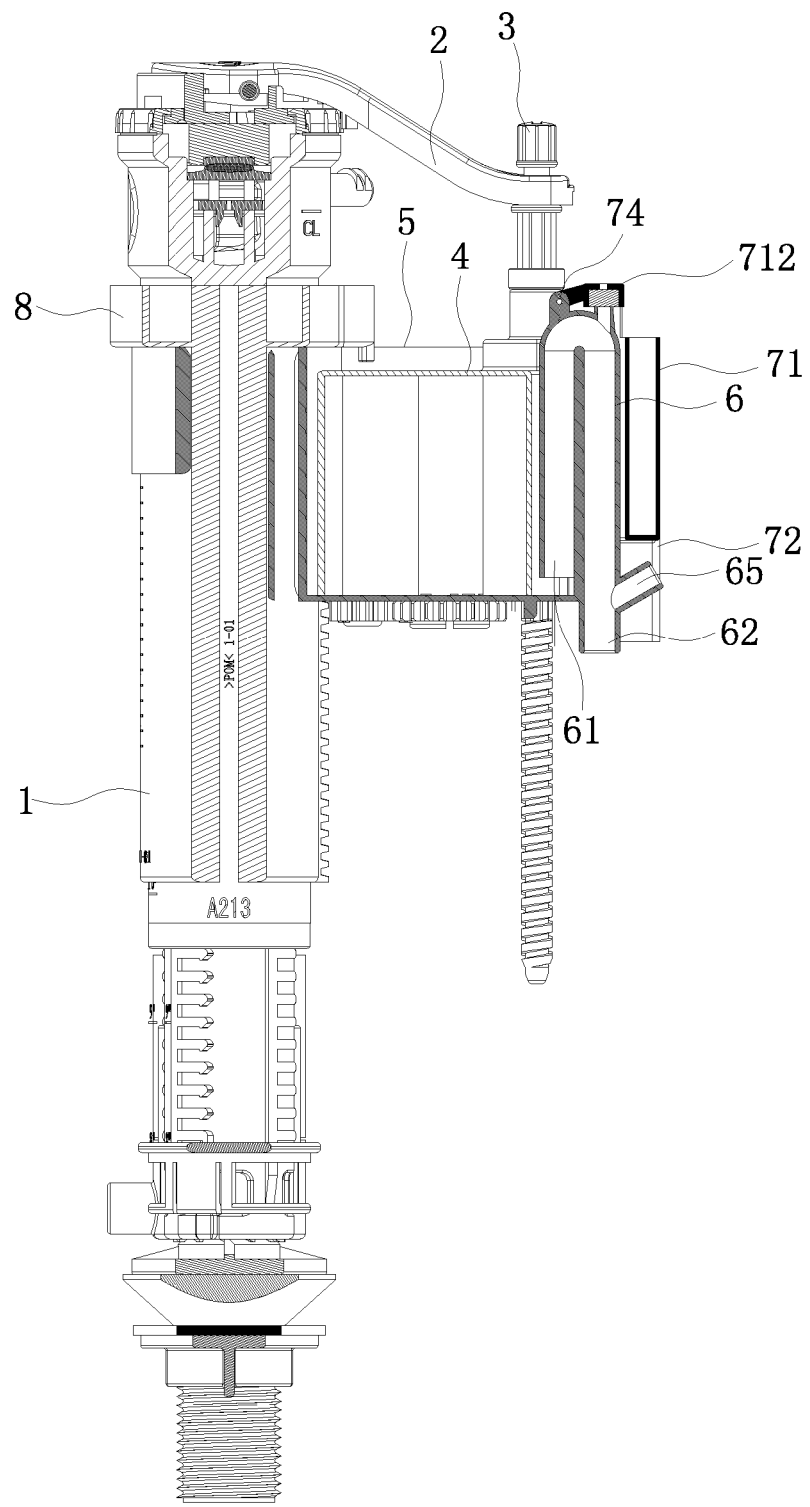
FIG. 8 is a cross-sectional view illustrating another mounting structure of the counterweight float of the present invention (an air aperture of a siphon tube being closed).

As shown in FIGS. 7 and 8, the counterweight buoyance switch 7 can be rotatably mounted, through a pivot pin 74, to the water container 5. In a condition where the buoyance of the counterweight buoyance switch 7 is greater than the weight thereof, the counterweight buoyance switch 7 swings upwards and floats up thereby opening the air aperture 63 of the siphon tube 6 and in a condition where the buoyance of the counterweight buoyance switch 7 is smaller than the weight thereof, the counterweight buoyance switch 7 swings downward and sinks down, making the closure pressing plate 712 block the air aperture 63 thereby closing the air aperture 63 of the siphon tube 6.

When water ingress is performed in a normal way, water flows through the water inlet valve body 1 into the water tank and the water level of the water tanks starts to rise so that, upon reaching a highest position of the water container 5, water flows into the water container 5. After water level inside the water container 5 rises, the float 4 is acted upon by buoyance to float up thereby driving the swing arm 2 to rotate and making the back pressure pad 21 close the back pressure hole 11, whereby water cannot flow through the back pressure hole 11 of the water inlet valve body 1 into the water tank and thus water ingress is stopped.

When the water tank is continuously suffering minor water leakage (seepage or creep), the water level of the water tank slowly drops down and under this condition, the counterweight buoyance switch 7 is acted upon by the buoyance of the buoyance water compartment 72, where the buoyance acting on the counterweight buoyance switch 7 is greater than the weight thereof, the air aperture 63 of the siphon tube 6 is opened, and the siphon effect of the siphon tube 6 is released. In the present invention, the bottom of the water container 5 is not provided with an opening so that the water level inside the water container 5 does not drop and thus, the swing arm 2 is not caused to rotate and the back pressure hole 11 is not opened, whereby the water inlet valve does not allow for water ingress and the water resources can be saved.

With the water level of the water tank slowly dropping down and water contained in the counterweight water compartment 71 of the counterweight buoyance switch 7 slowly flowing out through the water drain hole 711, the counterweight buoyance switch 7 is still acted upon by the buoyance of the buoyance water compartment 72 and the buoyance of the counterweight buoyance switch 7 is still greater than the weight thereof so that the air aperture 63 of the siphon tube 6 is kept open and no water ingress is allowed through the water inlet valve.

Continuous dropping of the water level of the water tank eventually drains off the water contained in the counterweight water compartment 71 and the counterweight buoyance switch 7 is acted upon by the weight to close the air aperture 63 of the siphon tube 6. Under this condition, the water level of the water tank drops with a greater extent and a slower speed, making it not possible to induce is large suction force and no siphon effect is induced in the siphon tube 6, so that the water level of the water container 5 is still kept from dropping down. And, thus, water ingress through the water inlet valve is not enabled and water resources can be saved.

In the present invention, the bottom of the water container 5 is not provided with an opening so that in an event of minor water leak of the water tank, no siphon effect is induced in the siphon tube 6 so that water contained in the water container 5 is hard to drain out and it needs to disassemble the water inlet valve to depress down the float 4 for causing water contained in the water container 5 to discharge through the siphon tube 7 to allow the water inlet valve to enable water ingress.

Figure 9:
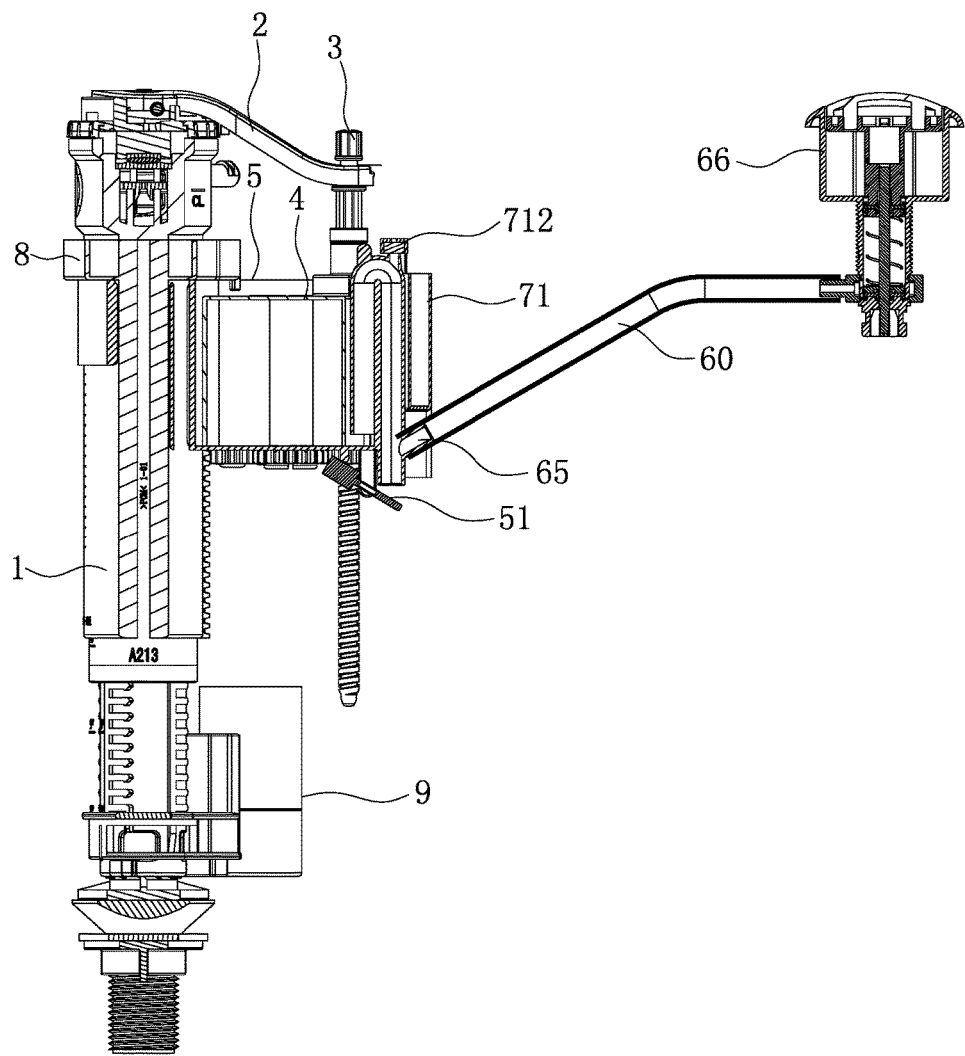
FIG. 9 is a cross-sectional view of a pressure release unlocking mechanism of the present invention.

Thus, the present invention comprises an air evacuation hole 65 formed in a lower end portion of the siphon tube 6. As shown in FIGS. 4 and 9, the air evacuation hole 65 is connected, via a passageway pipe 60, with an air pump 66. The air pump 66 has an actuation button that is common to a button of a discharge valve. Pressing down and thus actuating the air pump 66 to evacuate air from the siphon tube 6 would release pressure from the siphon tube 6 so that water of the water container 5 is drained through the siphon tube 6 to allow for water ingress of the water inlet valve. The air pump 66 is a known technique and structure specifics will not be provided herein.

As shown in FIGS. 2 and 3, to more clearly evacuate air from the siphon tube 6, the present invention comprises a leverage bar 51 pivotally connected to the water container 5. The leverage bar 51 has an end to which a counterweight 511 is mounted and an opposite end that is provided with a closure pad 512 that corresponds to and is mateable with the water egress opening 62 of the siphon tube 6. The closure pad 512 is opposite to the water egress opening 62. When the air pump 66 is actuated to evacuate air from the siphon tube 6, the closure pad 512 of the leverage bar 51 closes the water egress opening 62 of the siphon tube 6 so that evacuation of air from the siphon tube 6 can be made complete. When the siphon tube 6 drains water, said opposite end of the leverage bar 51 is spaced from the water egress opening 62.

As shown in FIG. 10, the present invention may comprise a link bar 52 pivotally connected to the water container 5. The link bar 52 has an end corresponding to the float 4 received in the water container 5 and an opposite end connected to a pull wire (not shown). The pull wire is connected to an actuation button that is common to a button of a discharge valve such that pressing down the actuation button pulls the pull wire to make the link bar 52 swing and one end of the link bar 52 depresses the float 4 down to have water contained in the water container 5 drained through the siphon tube 6 thereby allowing the water inlet valve to enable water ingress.

Figure 11:
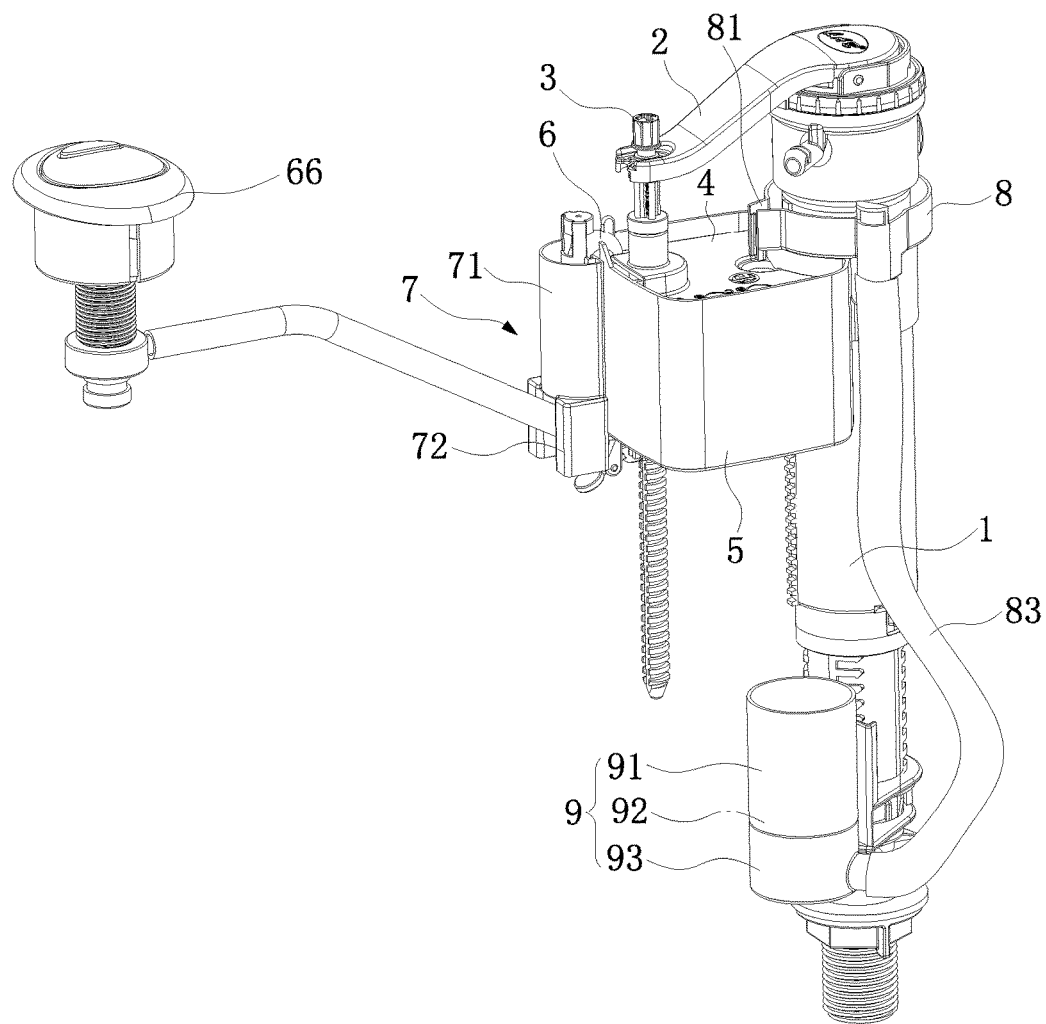
FIG. 11 is a schematic view illustrating connection between a water receptacle tray and a counterweight float according to the present invention.
Figure 12:
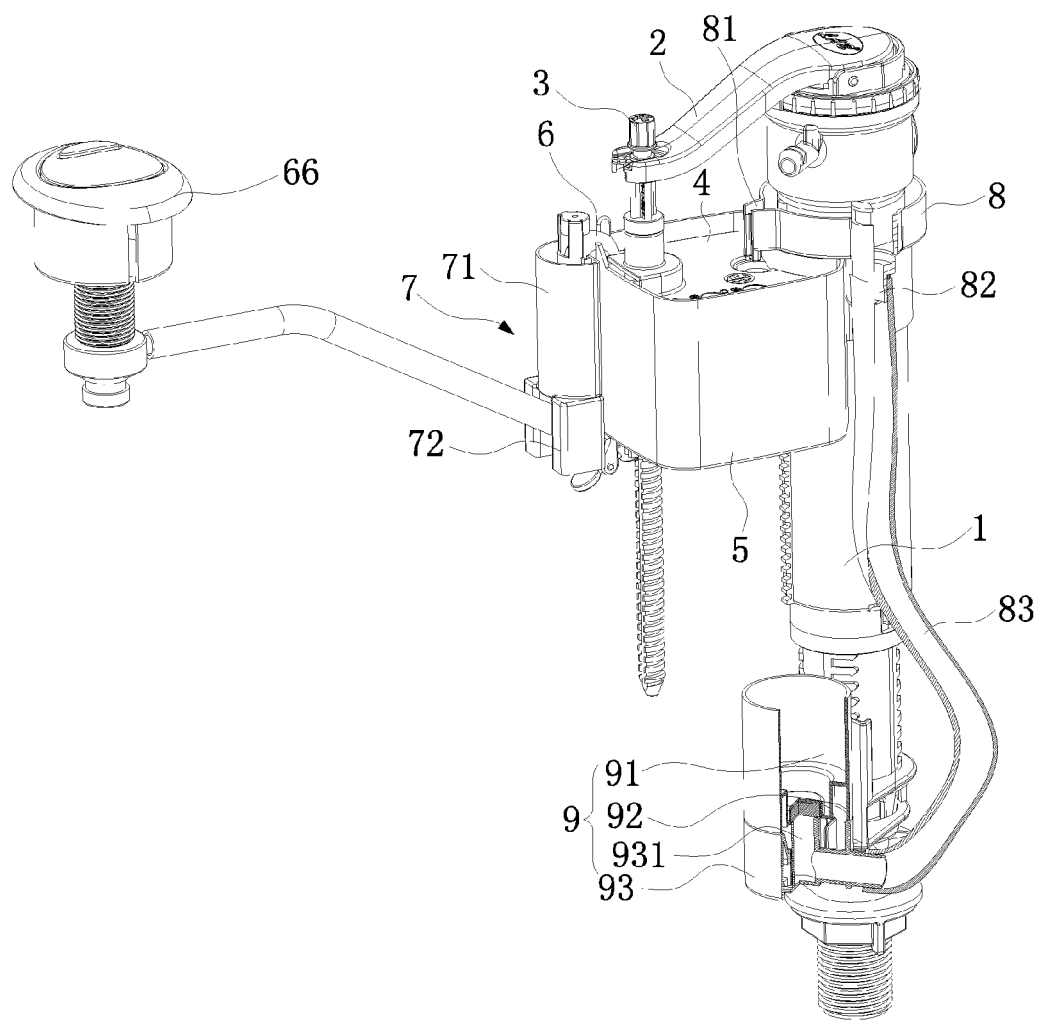
FIG. 12 is a partly cross-sectional view illustrating connection between the water receptacle tray and the counterweight float according to the present invention.

As shown in FIGS. 11 and 12, the present invention may further comprise a water receptacle tray 8 and a counterweight float 9. The water receptacle tray 8 is mounted on the water inlet valve body 1 and is located above the water container 5. The water receptacle tray 8 comprises an overflow port 81. The overflow port 81 is located above the water container 5. The water receptacle tray 8 has a bottom in which an opening 82 is formed. The counterweight float 9 is mounted on a lower end of the water inlet valve body 1. The counterweight float 9 comprises a water compartment 91, a buoyance compartment 92, and a fixation seat 93. The water compartment 91 and the buoyance compartment 92 are independent of each other but are integrated together. The water compartment 91 and the buoyance compartment 92 are movably mounted on the fixation seat 93 and the fixation seat 93 is mounted on the water inlet valve body 1. The fixation seat 93 comprises a water discharge opening 931, and the water discharge opening 931 is connected, via the passageway pipe 83, to the bottom opening 82 of the water receptacle tray 8. In a condition where the weight of the water compartment 91 is greater than buoyance, the water compartment 91 blocks the water discharge opening 931; and in a condition where the weight of the water compartment 91 is smaller than the buoyance, the water compartment 91 opens the water discharge opening 931.

In the present invention, the water container 5 has a bottom that does not have an opening. When a water tank suffers continuous major water leakage, the water level of the water tank would drop down quickly such that the counterweight buoyance switch 7 descends quickly therewith and the closure pressing plate 712 of the counterweight buoyance switch 7 blocks the air aperture 63 of the siphon tube 6. Under this condition, a siphon effect is induced in the siphon tube 6 and water contained in the water container 5 is completely drained out. The back pressure pad 21 of the swing arm 2 opens the back pressure hole 11 of the water inlet valve body 1 and water flows through the water inlet valve body 1 into the water tank so that the water inlet valve enables water ingress.

The water receptacle tray 8 is mounted on the water inlet valve body 1 and water enters the water receptacle tray 8 and flows via the opening 82 in the bottom of the water receptacle tray 8, further through the passageway pipe 83, into the fixation seat 93. Under this condition, since the water tank is suffering major water leakage, the buoyance compartment 92 would lose buoyance and the water compartment 91 is driven by gravity to block the water discharge opening 931 so that water that flows into the passageway pipe 83 flows backward to pass through the overflow port 81 of the water receptacle tray 8 and enter the water container 5. Since the bottom of the water container 5 does not have an opening, the water level in the water container 5 raises, making the float 4 received in the water container 5 ascend and drive the swing arm 2 to rotate thereby allowing the back pressure pad 21 to close the back pressure hole 11, whereby water cannot flow through the water inlet valve body 1 into the water tank. As such, ingress of water is stopped and water resources can be saved.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A minor water leak prevention apparatus for a water inlet valve, the minor water leak prevention apparatus is mounted to a water inlet valve body and comprises a swing arm, a regulation bar, a float, a water container, a siphon tube, and a counterweight buoyance switch; the swing arm is rotatably mounted to the water inlet valve body, the swing arm having an end to which a back pressure pad is mounted to correspond to a back pressure hole of the water inlet valve body, the swing arm having an opposite end connected to the regulation bar; the float is mounted on the regulation bar and received in the water container, the water container being mounted on the water inlet valve body; the siphon tube is mounted on the water container, the siphon tube being formed with an air aperture; the counterweight buoyance switch is mounted on the water container, the counterweight buoyance switch comprising a counterweight water compartment and a buoyance water compartment, the counterweight water compartment having a lower end in which a water drain hole is formed, the counterweight water compartment having an upper end to which a closure pressing plate is provided, the closure pressing plate corresponding to the air aperture, the counterweight buoyance switch controlling opening/closing of the air aperture.

2. The minor water leak prevention apparatus for a water inlet valve according to claim 1, wherein the counterweight buoyance switch is mounted on the siphon tube in an up and down slidable manner, wherein in a condition where buoyance of the counterweight buoyance switch is greater than the weight thereof, the counterweight buoyance switch slides upward and thus floats up thereby opening the air aperture of the siphon tube; and in a condition where the buoyance of the counterweight buoyance switch is smaller than the weight thereof, the counterweight buoyance switch slides downward and sinks down thereby making the closure pressing plate block the air aperture and thus closing the air aperture of the siphon tube.

3. The minor water leak prevention apparatus for a water inlet valve according to claim 1, wherein the counterweight buoyance switch is rotatably mounted, through a pivot pin, to the water container wherein in a condition where buoyance of the counterweight buoyance switch is greater than the weight thereof, the counterweight buoyance switch swings upwards and floats up thereby opening the air aperture of the siphon tube and in a condition where buoyance of the counterweight buoyance switch is smaller than the weight thereof, the counterweight buoyance switch swings downward and sinks down, making the closure pressing plate block the air aperture thereby closing the air aperture of the siphon tube.

4. The minor water leak prevention apparatus for a water inlet valve according to claim 1, wherein an air evacuation hole is formed in a lower end portion of the siphon tube, the air evacuation hole being connected, via a passageway pipe, with an air pump, whereby actuating the air pump to evacuate air from the siphon tube releases pressure from the siphon tube so that water of the water container is drained through the siphon tube, a leverage bar is pivotally connected to the water container, the leverage bar having an end to which a counterweight is mounted and an opposite end that is provided with a closure pad that corresponds to and is mateable with a water egress opening of the siphon tube, the closure pad facing the water egress opening, wherein in a condition where the air pump evacuates air from the siphon tube, the closure pad closes the water egress opening.

* * * * *